(12) United States Patent
Ziller et al.

(10) Patent No.: US 12,555,425 B2
(45) Date of Patent: Feb. 17, 2026

(54) METHOD FOR AUTHENTICATING A MOBILE ID TRANSMITTER, ID TRANSMITTER, AND SYSTEM

(71) Applicants: Huf Hülsbeck & Fürst GmbH & Co. KG, Velbert (DE); Volkswagen Aktiengesellschaft

(72) Inventors: Boris Ziller, Ratingen (DE); Marco Diekers, Neuss (DE); Bernd Ette, Wolfsburg (DE)

(73) Assignees: VOLKSWAGEN AKTIENGESELLSCHAFT, Wolfsburg (DE); HUF HÜLSBECK & FÜRST GMBH & CO. KG, Velbert (DE)

( * ) Notice: Subject to any disclaimer, the term of this patent is extended or adjusted under 35 U.S.C. 154(b) by 23 days.

(21) Appl. No.: 18/409,262

(22) Filed: Jan. 10, 2024

(65) Prior Publication Data

US 2024/0233462 A1 Jul. 11, 2024

(30) Foreign Application Priority Data

Jan. 11, 2023 (DE) ...................... 10 2023 100 511.1

(51) Int. Cl.
*G07C 9/00* (2020.01)
*G01S 11/02* (2010.01)
(Continued)

(52) U.S. Cl.
CPC .......... *G07C 9/00309* (2013.01); *G01S 11/02* (2013.01); *G01S 13/0209* (2013.01); *H04B 17/318* (2015.01)

(58) Field of Classification Search
CPC ...... G07C 9/00309; G07C 2009/00388; G07C 2009/00555
See application file for complete search history.

(56) References Cited

U.S. PATENT DOCUMENTS 10,427,643 B1 * 10/2019 Casamassima ...... H04B 17/318
10,562,496 B1    2/2020 Elangovan et al.
(Continued)

FOREIGN PATENT DOCUMENTS

DE    102020124466 A1    3/2011 ............. F01D 17/00
DE    102020102921 A1    8/2020 ............. B60R 25/00
(Continued)

OTHER PUBLICATIONS

Japanese Office Action, Application No. 2024001793, 9 pages, Nov. 26, 2024.
(Continued)

*Primary Examiner* — Nabil H Syed
(74) *Attorney, Agent, or Firm* — Slayden Grubert Beard PLLC

(57) ABSTRACT

The disclosure relates to a method for authenticating a mobile ID transmitter, which has an ID transmitter/BLE interface, at an access control unit with an access control unit/BLE interface of a physical unit, wherein the method comprises the following steps:
A) transmitting a beacon with a short beacon identifier in a first step; B) checking the short beacon identifier; C) performing a BLE communication sequence with steps; D) authenticating the ID transmitter. The disclosure also relates to an ID transmitter with an antenna, microcontroller, and sensor, wherein the ID transmitter forms a system with the physical unit, also having an antenna and control apparatus.

15 Claims, 1 Drawing Sheet

(51) Int. Cl.
*G01S 13/02* (2006.01)
*H04B 17/318* (2015.01)

(56) References Cited

U.S. PATENT DOCUMENTS

| | | | |
|---|---|---|---|
| 10,988,113 | B2 | 4/2021 | Hassani et al. |
| 11,072,310 | B1 | 7/2021 | Lazarini et al. |
| 11,313,271 | B2 | 4/2022 | Depaoli et al. |
| 11,643,050 | B2 | 5/2023 | Brückner |
| 2013/0017816 | A1 | 1/2013 | Talty et al. ............ 455/418 |
| 2018/0099643 | A1 | 4/2018 | Golsch et al. |
| 2020/0029213 | A1 | 1/2020 | Nölscher et al. |
| 2021/0078534 | A1 | 3/2021 | Stitt |
| 2022/0109561 | A1 | 4/2022 | Yang et al. |
| 2023/0365102 | A1 | 11/2023 | Yamamoto et al. |
| 2024/0255605 | A1* | 8/2024 | Sanji .................... G01S 5/0295 |

FOREIGN PATENT DOCUMENTS

| | | | |
|---|---|---|---|
| DE | 102020124467 A1 | 3/2021 | ............ B60R 25/24 |
| DE | 102021106923 A1 | 10/2021 | ............ H04W 12/06 |
| DE | 102020214381 A1 | 5/2022 | ............ B60R 25/24 |
| DE | 102021204529 A1 | 8/2022 | ............ B60R 25/24 |
| EP | 4063203 A1 | 9/2022 | ............ B60R 25/24 |
| JP | 2022115132 A | 8/2022 | ............ B60R 25/24 |
| JP | 2022144134 A | 10/2022 | ............ B60R 25/24 |

OTHER PUBLICATIONS

German Office Action, Application No. 102023100511.1, 6 pages, Jul. 12, 2023.

Extended European Search Report, Application No. 23211734.1, 8 pages, Apr. 22, 2024.

\* cited by examiner

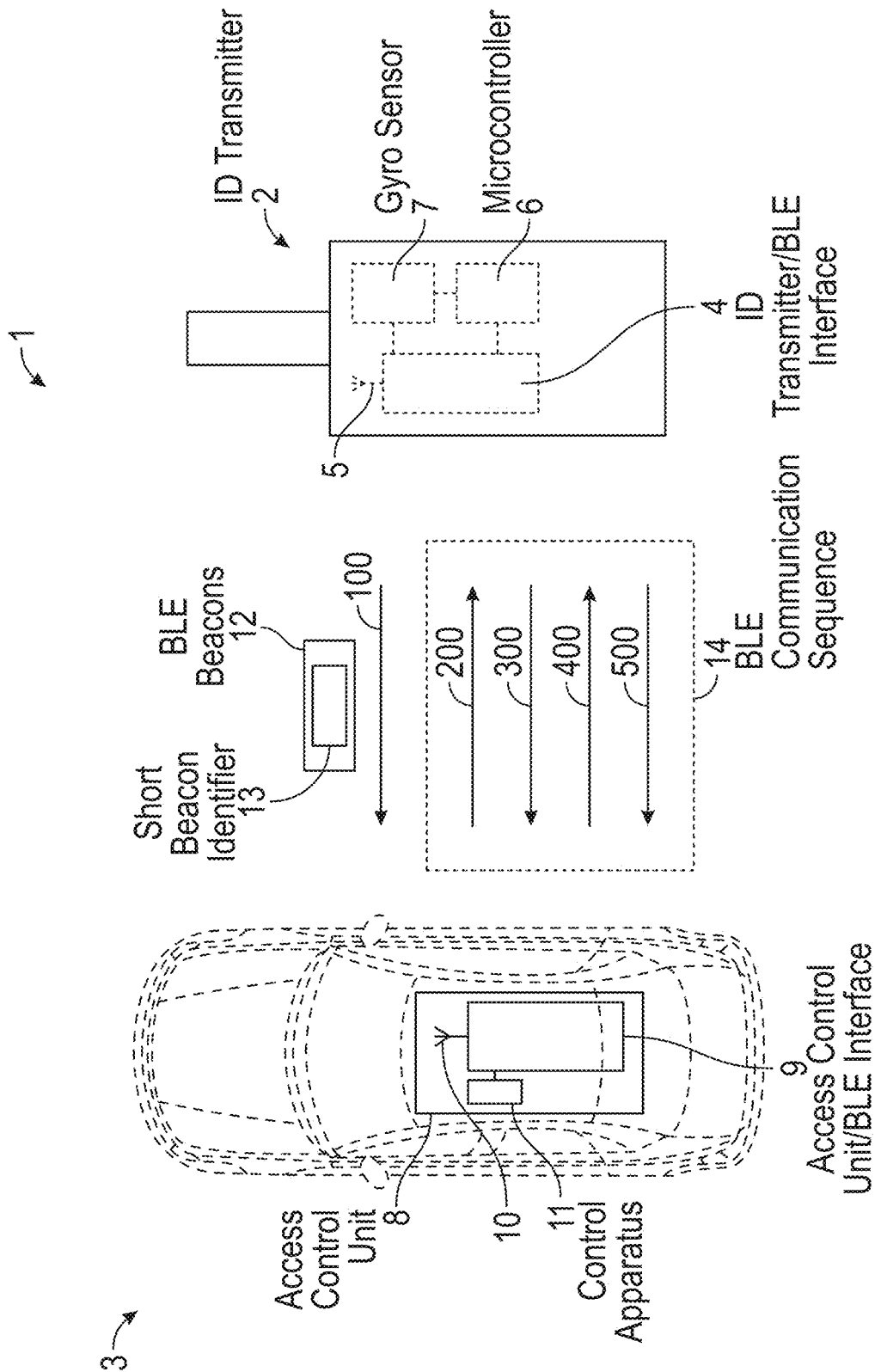

METHOD FOR AUTHENTICATING A MOBILE ID TRANSMITTER, ID TRANSMITTER, AND SYSTEM

CROSS-REFERENCE TO RELATED APPLICATIONS

This application claims priority to German Patent Application No. DE 10 2023 100 511.1, filed on Jan. 11, 2023 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to a method for authenticating a mobile ID transmitter. The disclosure also relates to an ID transmitter and a system having an ID transmitter and a physical unit.

In many physical units, such as, for example, vehicles, it has now been established to authenticate oneself with mobile ID transmitters at an access control unit of the physical unit and thereby bring about approval of access to the physical unit through the access control unit. In the case of physical units designed as vehicles, installing electronic locking systems has long since been and is increasingly typical as an example of an access control unit. Electronic locking systems may be based, for example, on a use of remote-control keys, which communicate with the vehicle by means of radio waves. Such systems have been common for some time under various designations, such as, for example, the designations passive-entry/passive-start (PEPS) and remote keyless entry (RKE). PEPS and RKE systems may be based, for example, on a combination of low-frequency and high-frequency radio communication (in LF and HF frequency ranges, the latter typically in the UHF range) between an ID transmitter with a central control unit of a vehicle. One example of a possible design is the polling transmission of an LF wake-up signal for waking an ID transmitter prepared to receive LF signals, which, in reaction to receiving the LF signal, initiates bidirectional radio communication in the HF frequency range for the exchange of authentication information.

The systems are mostly based on the principle that radio communication that results in a rough initial estimate of the position of the ID transmitter is performed at recurring intervals. For example, in polling systems of the type explained above, an LF wake-up signal is continuously transmitted by a stationary physical unit, wherein as a result of the ID transmitter receiving the LF signal, it is implicitly ensured due to the limited range of the LF signals that the ID transmitter is positioned within an at least roughly delimitable distance around the physical unit. This ensures that the HF communication is started in a situation in which the ID transmitter is located in the vicinity of the physical unit.

More complex versions of the position determinations are also possible, which is driven in particular by the endeavor to achieve an increase in operational convenience or an increase in operational security through more precise determination of the position of the ID transmitter. Examples are the use of RSSI values during Bluetooth communication or in the use of UWB ranging, meaning: distance determination based on a UWB signal propagation delay, which can be followed in each case by, for example, a trilateration.

The communication between the ID transmitter and the access control unit during an authentication process and the radio communication provided in advance for this purpose, for example, provided for position determination of the ID transmitter, is unavoidably associated with a corresponding power requirement. With the background of, on the one hand, the naturally present desire for intervals between battery changes of the ID transmitter that are as long as possible and, on the other hand, the increasing miniaturization of the ID transmitter, in turn associated with the need for energy sources of correspondingly small dimensions, it is desired to enable an authentication of a mobile ID transmitter at an access control unit with the smallest possible power requirement, but without having to sacrifice a large degree of functionality to do so.

SUMMARY

A need exists to provide a possibility for authenticating a mobile ID transmitter at an access control unit of a physical unit that can be implemented in the ID transmitter with a moderate power requirement.

The need is addressed by a method for authenticating a mobile ID transmitter, an ID transmitter, and/or a system consisting of an ID transmitter and a physical unit according to the independent claim(s). Embodiments of the invention are described in the dependent claims, the following description, and the drawings.

BRIEF DESCRIPTION OF THE DRAWING

The FIG. shows a schematic representation of an embodiment of a system consisting of an ID transmitter and a physical unit with an access control unit as well as with a sequence of radio communication between the ID transmitter and the access control unit of the physical unit during the authentication of the ID transmitter by the access control unit.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for authenticating a mobile ID transmitter at an access control unit of a physical unit is provided. The access control unit serves to restrict and approve access to the physical unit, wherein the approval takes place after a successful authentication and is not part of the described method. One example of the physical unit can be a vehicle; the access control unit of the vehicle can be designed, for example, as an electronic locking system of the vehicle.

The mobile ID transmitter has at least one ID transmitter/BLE interface and the access control unit has at least one access control unit/BLE interface.

The acronym BLE stands for Bluetooth Low Energy. Bluetooth Low Energy is a communication protocol that is specified in the Bluetooth specifications with the version number 4.0 and later, for example, on the priority date of this application, the Core Specification 4.2 at the address https://www.bluetooth.com/specifications/specs/core-specification-4-2/.

The term BLE interface refers to a totality of components that is suitable for BLE communication in accordance with the Bluetooth specification. All hardware and software requirements for operation of BLE communication in accordance with the specifications may therefore be met. In particular, the BLE interface has an antenna. A BLE interface can be, for example, a module that meets all requirements for BLE communication; but also a totality of individual components coupled to each other can be provided. The ID transmitter/BLE interface and/or the access control unit/BLE interface can be designed, for example, as Bluetooth modules available on the market.

In some embodiments, the method provides the following steps:

A) A beacon with a short beacon identifier that characterizes the ID transmitter/BLE interface is transmitted from the ID transmitter/BLE interface. This means that, at the beginning of the method, the ID transmitter/BLE interface transmits a beacon with a short beacon identifier containing a marker that can be traced back to the ID transmitter/BLE interface and thus to the ID transmitter. The short beacon identifier is a beacon or a part of a beacon.

Transmitting the beacon with the short beacon identifier can be triggered, for example, by predetermined events, but a continuous transmission at predetermined intervals, for example, can also be provided.

The term beacon is to be understood in the manner introduced here as a short designation for a Bluetooth Low Energy beacon. The term beacon has been established within the use of Bluetooth Low Energy in the context of the Bluetooth specifications with the version 4.0 or later. In fields of application in which hardware transmitters transmit an identifier for receiving from surrounding receiving devices, a beacon is an established term to the person skilled in the art. Fields of application in which the beacons are used can often be found in connection with localization. The use of beacons is typically based on predetermined protocols, for example, on the proprietary iBeacon protocol from Apple® or the freely implementable Eddystone protocol from Google®. To implement the present teachings, one of these two or any other available beacon protocol can be used.

In all applications of BLE beacons, it is beneficial that the transmission of data packets is specified that in particular have the two features that they are, for one thing, comparatively small (for example, in the case of an iBeacon data field 31 bytes and in the case of an Eddystone beacon 255 bytes) and, for another, can be configured such that they contain a short identifier. A universally unique identifier (UUID), for example, can be provided as a short identifier, for which 16 byes are granted, for example, in the iBeacon protocol and which can be designed in the Eddystone beacon as a combination of a 10-byte namespace ID and a 6-byte instance ID.

The UUIDs are assigned to the ID transmitter/BLE interfaces to be used according to the teachings herein, wherein the assignment can have been made, for example, by the provider of the physical unit, for example, a vehicle OEM, before putting the physical unit on the market.

In a further step, namely step B), the access control unit checks the short beacon identifier after the access control unit/BLE interface has received the beacon. Thus, when the ID transmitter has come sufficiently close to the access control unit, or more specifically: to the access control unit/BLE interface or, respectively, to the antenna of the access control unit/BLE interface, the access control unit/BLE interface can receive the beacon with the short beacon identifier, whereupon the short beacon identifier is checked by the access control unit. This can take place, for example, with a microcontroller of the access control unit/BLE interface or with a microcontroller coupled to the access control unit/BLE interface, alternatively with a separate control device.

C) After the check of the short beacon identifier has found that the short beacon identifier characterizes an ID transmitter/BLE interface known to the access control due to corresponding configuration, for example, by the manufacturer, a BLE communication sequence between the access control unit/BLE interface and the ID transmitter/BLE interface is started and performed according to some embodiments. The performance of the BLE communication sequence proceeds from the access control unit/BLE interface, meaning: the access control unit/BLE interface initiates the performance of the BLE communication sequence. This means that a continuing BLE communication, namely within the BLE communication sequence, between the access control unit/BLE interface and the ID transmitter/BLE interface only takes place under the condition that a short beacon identifier with a predetermined value has previously been received and recognized as such.

It can be provided that a predetermined short beacon identifier or a list of multiple predetermined short beacon identifiers is stored on a storage means coupled to the microcontroller responsible for checking the short beacon identifier, and that the access control unit/BLE interface is designed so that it initiates the BLE communication sequence if the received short beacon identifier is contained in this list and this has been established through the comparison performed during the check. This can be implemented, for example, such that the microcontroller is configured to control the access control unit/BLE interface to initiate the BLE communication sequence after the microcontroller has established during the check of the short beacon identifier that a predetermined short beacon identifier is present.

The BLE communication sequence between the access control unit/BLE interface and the ID transmitter/BLE interface is planned such that, during the BLE communication sequence, authentication data is transferred from the ID transmitter/BLE interface to the access control unit/BLE interface, and the ID transmitter is authenticated by the access control unit using this data. For example, it can be provided that the ID transmitter/BLE interface transfers a certificate of the ID transmitter to the access control unit/BLE interface, and that a microcontroller coupled to the access control unit/BLE interface verifies the validity of the certificate, for example, if an asymmetrical cryptographic method is used, with a public certificate of an asymmetrical certificate pair transferred by the ID transmitter to the access control unit as verification using a private certificate of the asymmetrical certificate pair.

In some embodiments, the method is based in a particular manner on the fact that a rough initial localization of the ID transmitter in the vicinity of the physical unit takes place in that the physical unit receives a beacon with a short beacon identifier. Upon receiving the beacon with the short beacon identifier, the access control unit is implicitly given the information that the ID transmitter is located within a distance around the access control unit/BLE interface in the range of the beacon communication, which is typically on the scale of some 10 m, and if applicable, depending on the desired application scenarios, can also still be reduced toward lower values by the developers entrusted with the implementation.

One benefit of using beacon communication, meaning: using in particular protocols based on sending BLE beacons, is that they are associated with a comparatively low power consumption or, respectively, power requirement—not least due to the predetermined comparatively low size of the individual beacons—so that a certain longevity of the ID transmitter may be expected before, for example, a battery change is necessary.

In some embodiments, a design of the performance of the BLE communication sequence from step C) can comprise that, after the short beacon identifier has been recognized as a short beacon identifier characterizing a known ID transmitter/BLE interface, the access control unit/BLE interface transmits a data provision request. For example, this data provision request can be a scan request query, meaning: a scan request corresponding to the Bluetooth protocol, for example, a scan request provided in accordance with Bluetooth Core Specification version 5.0, 5.1, or 5.2.

Furthermore, the present embodiments can provide that, after the ID transmitter/BLE interface obtains the data provision request, the ID transmitter/BLE interface performs the performance of the BLE communication in the manner described above. This means that, as a reaction to the data provision request, designed, for example, as a scan request query, the authentication data is provided by the ID transmitter to the access control unit.

In some embodiments, it can be provided that the performance of the BLE communication sequence first comprises step C1), in which the data provision request is sent from the access control unit/BLE interface, and that, after it is received by the ID transmitter/BLE interface, the ID transmitter, prompted, for example, by a microcontroller present in the ID transmitter and coupled to the ID transmitter/BLE interface, prompts as step C2) the detection of sensor data by means of a sensor also present in the ID transmitter and hereafter sends at least a part of the sensor data or information derived from the sensor data or from a part of the sensor data as response data from the ID transmitter/BLE interface. Sending the sensor data can be designed in this case in particular as sending within a beacon data packet.

C3) After the response data has been received by the access control unit/BLE interface, it is checked for a validation criterion by the access control unit, for example, with a microcontroller contained in the access control unit and coupled to the access control unit/BLE interface.

In this case, it can be provided that, after the check of the response data for the predetermined validation criterion outputs a positive result, a connection request is transmitted. The connection request can be designed, for example, as a scan request in the sense of the Bluetooth Core Specification.

Following this, the initiation and performance of BLE communication between the ID transmitter/BLE interface and the access control unit/BLE interface can be prompted, in the context of which the transfer of authentication data from the ID transmitter to the access control unit takes place. This can take place in particular in the context of a regular BLE connection.

With the described method procedure, an approach is presented in which the access control unit/BLE interface can prompt the ID transmitter to detect sensor data, whereupon this sensor data is transferred to the access control unit, and as a result of the check for a validation criterion, the sensor data contribute to the fact that the continued communication and thus also the authentication of the ID transmitter can be made dependent on specific use scenarios. The use scenarios that should enable an authentication and the validation criteria suitable for them for validating the sensor data must be found in particular empirically here. Once a given validation criterion must be met by the sensor data as an additional requirement for a continuation of the authentication process, the security of the authentication is potentially increased by the additional need, since with a suitable selection of sensor data, the method can be set such that the probability of erroneous authentications can be decreased. Which sensor data can be considered suitable in this case and which validation criteria it should be subjected to must, for example, be empirically determined. Another benefit of this embodiment is that, at least up through step C3, the data transfer for example takes place in the context of BLE beacons, whereby the power consumption when performing the method remains comparatively moderate in a beneficial manner.

The data provision request can, as already indicated above, be a scan request query.

The response data can be designed as beacon response data or be contained in beacon response data.

The response data can be or comprise a scan response packet.

In some embodiments, the sensor is an acceleration sensor, or the sensor is a gyro sensor, or the sensor is an acceleration and gyro sensor. Corresponding to the sensor, the obtained response data is acceleration data, or gyro data, or acceleration and gyro data.

Checking the response data for example comprises comparing RSSI values of the response data with stored reference values, and/or comparing a completed movement of the sensor data during a defined time period with stored reference values.

For example, it can be provided that checking the response data is a completed movement of gyro data of a gyro sensor during a defined time period and the validation criterion consists in that the acceleration in each of the three considered coordinates is below a predetermined value. Alternatively or additionally and in some embodiments, the validation criterion can comprise that the RSSI value of the response data is below a predetermined threshold. With such a configuration, for example, in the case of empirically correspondingly found values, the validation would offer additional security that the operator is actually located within a predetermined distance from the access control unit and desires access. For the case that the operator, for example, passes by the access control unit and does not stop at it, it could be recognized due to the acceleration data, if this is suitably selected, that the operator is present but with a certain probability does not desire access even, for example, at a very small distance of the operator from the access control unit. Due to the fact that the validation of the sensor data takes place before the exchange of the authentication data, and the sensor data in turn are sent in a small beacon packet, the necessary power consumption for performing the method is reduced, which is highly relevant in particular from the perspective of the portable and comparatively small ID transmitter in the sense of intervals between two battery changes that are as long as possible. Access security is also increased in that the information from sensor data is combined with that from authentication data.

The connection request can be, for example, a scan request query.

To initiate the BLE communication, it can be provided in some embodiments that a BLE advertising is transmitted by the ID transmitter/BLE interface. This means that it is first signaled to the ID transmitter with the connection request, designed, for example, as a scan request, that the access control unit considers an intention for authentication under the predetermined criteria to be present with a certain probability. The ID transmitter/BLE interface responds to this with, for example, a BLE advertising, whereby it brings about the establishment of a regular BLE connection between the ID transmitter/BLE interface and the access control unit/BLE interface.

In some embodiments, it can be provided that a UWB ranging between a control unit/UWB interface and an ID transmitter/UWB interface present in the ID transmitter is additionally performed after the initiation of the BLE communication, either in every case or for the case that additional requirements are present to test the plausibility of a distance of the ID transmitter from the physical unit. Due to the fact that UWB ranging has very good precision in distance determination, this allows a more precise determination of the distance of an operator carrying the ID transmitter with him from the physical unit in many cases; the data obtained on the basis of the BLE communication can thus be more precisely validated on the basis of a distance determined by means of UWB ranging; for example, it can be provided that, before completion of the authentication, the criterion is checked of whether the operator is located within a predetermined distance and/or outside a predetermined distance around a UWB interface of the physical unit, determined by means of UWB ranging, and that the authentication is only completed when this criterion is met as an additional criterion.

It is discussed in the preceding that the method may be initiated in that a short beacon identifier is output. In some embodiments, it can be provided that this transmission of the short beacon identifier is only triggered when a movement of the ID transmitter has been recognized by means of a movement sensor or acceleration sensor or gyro sensor or acceleration and gyro sensor arranged in the ID transmitter. This means that, in a case in which an ID transmitter remains unmoving for a longer time period, no radio communication whatsoever takes place from the ID transmitter (a sleep state is therefore present), but rather a signal is only output to a microcontroller in the ID transmitter when a movement is recognized with one of the sensors mentioned above, whereupon this signal prompts the beacon to be transmitted, for example, one time or repeated at regular intervals for a predetermined time period with subsequent renewed assumption of the sleep state once the predetermined time period has elapsed. In this manner, the power required by the ID transmitter can be reduced further.

In some embodiments, an ID transmitter for authentication at a physical unit to be controlled has at least:
an ID transmitter/BLE interface with an antenna;
a microcontroller coupled to the ID transmitter/BLE interface;
for example a sensor coupled to the microcontroller, designed as an
a) acceleration sensor, or
b) gyro sensor, or
c) acceleration and gyro sensor;
for example additionally a UWB interface coupled to the microcontroller,
wherein the microcontroller is designed to perform the steps of the ID transmitter in a method in accordance with the teachings herein, e.g., in accordance to one of the accompanying claims.

In some embodiments, the physical unit is a vehicle, or for example a land vehicle, for example a passenger car.

In some embodiments, a system consisting of an ID transmitter and a physical unit is provided. The ID transmitter is an ID transmitter in the previously described manner.

The physical unit has an access control unit, wherein the access control unit has at least:
an access control unit/BLE interface with an antenna,
a control apparatus coupled to the access control unit/BLE interface and for example designed as a microcontroller.

The control apparatus of the access control unit is designed to perform the steps of the access control unit in the method described herein or any embodiments.

The ID transmitter and the access control unit may be configured to be adapted to each other such that the ID transmitter is prepared for authentication at the access control unit with authentication data stored on a storage means of the ID transmitter, wherein the authenticity of the authentication data can be established by the control apparatus of the access control unit. One example of the implementation of this authentication of the ID transmitter at the access control unit is the design of the authentication data as a public key of an asymmetrical key pair, wherein the private key for establishing the authenticity is stored in a storage means of the control apparatus of the access control unit or in a storage means coupled to the control apparatus of the access control unit, and the control apparatus is prepared with the necessary cryptographic programs for authenticating the key obtained from the ID transmitter. Of course, other authentication methods known to the person skilled in the art can also be implemented.

Further details, features, and benefits of the method are apparent from the following description in conjunction with the FIG., in which an embodiment is shown by way of example.

It is understood that the features mentioned in the preceding as well as in the following can be used not only in the combination indicated in each case, but also in other combinations or alone.

The FIG. shows: a schematic representation of a system consisting of an ID transmitter and a physical unit with an access control unit as well as with a sequence of radio communication between the ID transmitter and the access control unit of the physical unit during the authentication of the ID transmitter by the access control unit.

A system 1 consisting of the ID transmitter 2 and the physical unit 3 designed as a passenger vehicle is shown.

The ID transmitter 2 has an ID transmitter/BLE interface 4 with an antenna 5. A microcontroller 6 that is coupled to the ID transmitter/BLE interface 4 is present in the ID transmitter 2. The ID transmitter 2 also has an acceleration and gyro sensor 7, which is also coupled to the microcontroller 6.

The microcontroller 6 is programmed to prompt the ID transmitter-side actions during an authentication of the ID transmitter 2 at the vehicle 3.

The physical unit 3 designed as a passenger vehicle comprises an access control unit 8. The access control unit 8 has at least the following components:

- an access control unit/BLE interface 9 with an antenna 10,
- a control apparatus 11 coupled to the access control unit/BLE interface 9 and for example designed as a microcontroller.

The control apparatus 11 is programmed to perform the steps of the access control unit 8 in the communication with the ID transmitter 2.

Authenticating the mobile ID transmitter at the vehicle is shown schematically in the FIG.:

At certain intervals, for example, of multiple 10 microseconds, the ID transmitter transmits BLE beacons 12, which are provided with a short beacon identifier 13 that characterizes the ID transmitter/BLE interface (step 100);

B) after the access control unit/BLE interface 9 has received the beacon 12, the access control unit 8 checks the short beacon identifier 13, for example, with the control apparatus 11, to determine whether the beacon was transmitted by the ID transmitter 2 assigned to the vehicle 3;

C) after the access control unit 8 has established that the short beacon identifier originates or seems to originate from the assigned ID transmitter, the access control unit 8 starts a BLE communication sequence 14 between the access control unit/BLE interface 9 and the ID transmitter/BLE interface 4:

First, a data provision request designed as a scan request query is sent from the access control unit/BLE interface 9 (step 200);

the ID transmitter/BLE interface 4 receives the data provision request, and the microcontroller 6 interprets it as a request to record sensor data from the acceleration and gyro sensor 7 for a certain time period, for example, of several 100 milliseconds, and transmit this data with the ID transmitter/BLE interface 4 (step 300);

the access control unit/BLE interface 9 receives the data, it is checked with the microcontroller 11 of the access control unit 8 for at least one validation criterion, for example, whether the movement of the ID transmitter has taken place within a certain path in the certain time period;

when the check of the response data for the validation criterion outputs a positive result, a scan request takes place by means of the access control unit/BLE interface (step 400), which answers it with a BLE advertise signal (step 500).

A BLE connection is established, whereupon the ID transmitter is finally authenticated, in a manner known to the person skilled in the art, in bidirectional communication by the access control unit using authentication data that was transferred in the BLE communication sequence from the ID transmitter/BLE interface to the access control unit/BLE interface.

With the described approach, it is achieved that advance communication with transfer of relevant data and an advance plausibility test takes place on the basis of a BLE beacon transfer before authenticating the ID transmitter in the context of BLE communication and the subsequent check of the transferred data. The transfer of the BLE beacon is possible with a moderate power requirement in particular due to the only small data packet size, so that a comparatively long service life of the battery present in the ID transmitter is obtained in a particularly beneficial manner with simultaneously very good security of the method due to the multistage validation and authentication.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for authenticating a mobile ID transmitter, which has an ID transmitter/BLE interface, at an access control unit of a physical unit, wherein the access control unit can restrict and approve access to the physical unit, and wherein the access control unit has an access control unit/BLE interface, wherein the method comprises:

transmitting a BLE beacon data package with a short beacon identifier, which characterizes the ID transmitter/BLE interface, from the ID transmitter/BLE interface;

after the access control unit/BLE interface has received the beacon, checking the short beacon identifier by the access control unit;

after the check of the short beacon identifier has found that the short beacon identifier characterizes a known ID transmitter/BLE interface, starting from the access control unit/BLE interface: performing a BLE communication sequence between the access control unit/BLE interface and the ID transmitter/BLE interface; and authenticating the ID transmitter by the access control unit using authentication data that were transferred in the BLE communication sequence from the ID transmitter/BLE interface to the access control unit/BLE interface; and wherein performing the BLE communication sequence comprises:

starting from the access control unit/BLE interface: transmitting a data provision request;

after the ID transmitter/BLE interface has received the data provision request, detecting sensor data from a sensor present in the ID transmitter and transferring at least a part of the sensor data or information derived therefrom as response data from the ID transmitter/BLE interface;

after the access control unit/BLE interface has received the response data, checking of the response data by the access control unit for at least one validation criterion;

if the check of the response data outputs a positive result: transmitting a connection request; and after the ID transmitter/BLE interface has obtained the connection request: initiating and performing BLE communication between the ID transmitter/BLE interface and the access control unit/BLE interface for transferring authentication data from the ID transmitter to the access control unit; and wherein the checking of the response data comprises comparing RSSI values of the response data and a completed movement of the sensor data during a defined time period with stored reference values.

2. The method of claim 1, wherein performing the BLE communication sequence comprises:

starting from the access control unit/BLE interface: transmitting a data provision request;

after the ID transmitter/BLE interface has obtained the data provision request: initiating and performing BLE communication between the ID transmitter/BLE interface and the access control unit/BLE interface for transferring authentication data from the ID transmitter to the access control unit.

3. The method of claim 1, wherein the data provision request is a scan request query.

4. The method of claim 1, wherein the response data are designed as beacon response data or are contained in beacon response data.

5. The method of claim 4, wherein the response data is or comprises a scan response packet.

6. The method of claim 1, wherein
the sensor is an acceleration sensor and the response data is acceleration data, or
the sensor is a gyro sensor and the response data is gyro data, or
the sensor is an acceleration and gyro sensor and the response data is acceleration and gyro data.

7. The method of claim 1, wherein the connection request is a scan request query.

8. The method of claim 2, wherein, to initiate the BLE communication, a BLE advertising is transmitted from the ID transmitter/BLE interface.

9. The method of claim 2, wherein, after the initiation of the BLE communication, a UWB ranging is additionally performed between a control unit/UWB interface and an ID transmitter/UWB interface to test the plausibility of a distance of the ID transmitter from the physical unit.

10. The method of claim 1, wherein transmitting the beacon with the short beacon identifier is triggered by the recognition of a movement of the ID transmitter by means of a movement sensor or acceleration sensor or gyro sensor or acceleration and gyro sensor arranged in the ID transmitter.

11. A system consisting of an ID transmitter and a physical unit, wherein the ID transmitter has at least:
an ID transmitter/BLE interface with an antenna;
an ID-transmitter microcontroller coupled to the ID transmitter/BLE interface; and
a sensor coupled to the ID-transmitter microcontroller and configured as an
a) acceleration sensor, or as a
b) gyro sensor, or as an
c) acceleration and gyro sensor; and
wherein the ID-transmitter microcontroller is configured to:
transmit a BLE beacon data package with a short beacon identifier, which characterizes the ID transmitter/BLE interface; and
selectively perform a BLE communication sequence between the access control unit and the ID transmitter/BLE interface; and wherein the physical unit has an access control unit, wherein the access control unit has at least:
an access control unit/BLE interface with an antenna,
an access-control unit microcontroller coupled to the access control unit/BLE interface,
wherein the access-control unit microcontroller is configured to perform the steps of the access control unit in the method of claim 1,
wherein the ID transmitter and the access control unit are configured to be adapted to each other such that the ID transmitter is prepared for authentication at the access control unit with authentication data stored on a storage means of the ID transmitter, and the authenticity of the authentication data can be established by the control apparatus of the access control unit.

12. The system of claim 11, wherein the physical unit is a vehicle.

13. The method of claim 3, wherein the response data are designed as beacon response data or are contained in beacon response data.

14. The method of claim 13, wherein the response data is or comprises a scan response packet.

15. The method of claim 1, wherein the stored reference values, against which the completed movement of the sensor data are compared, are based on empirical data for one or more use scenarios.

* * * * *